H. AND C. WEINBERG.
SAFETY DEVICE FOR AUTOMOBILES.
APPLICATION FILED JAN. 18, 1918.
Reissued Mar. 30, 1920. 14,831.
2 SHEETS—SHEET 1.
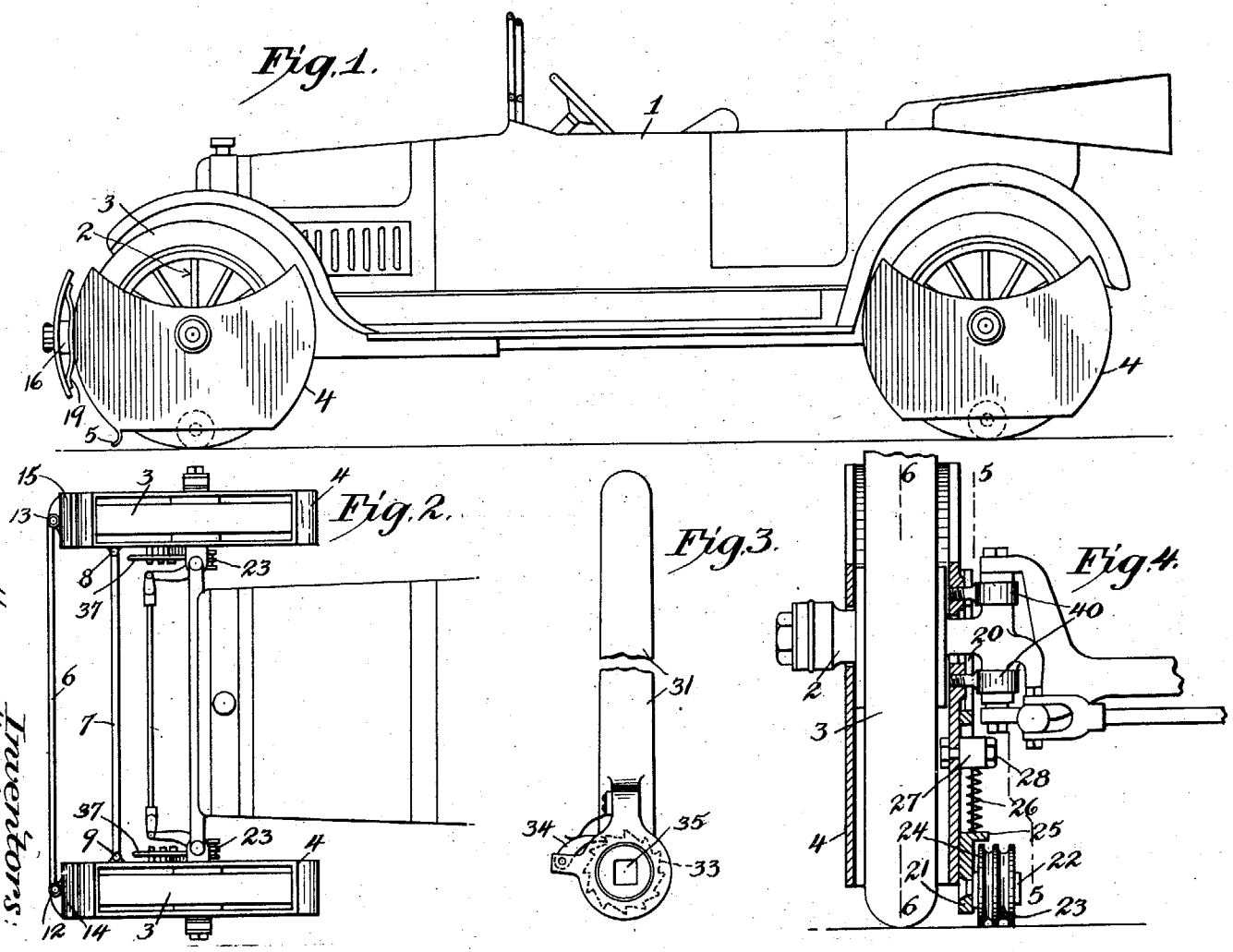
Inventors:
Hyman Weinberg.
Charles Weinberg.
By William E. Richards,
Attorney.

H. AND C. WEINBERG.

SAFETY DEVICE FOR AUTOMOBILES.

APPLICATION FILED JAN. 18, 1918.

Reissued Mar. 30, 1920. 14,831

2 SHEETS—SHEET 2.

Inventors:
Hyman Weinberg.
Charles Weinberg.
By William A. Richards.
Attorney.

UNITED STATES PATENT OFFICE.

HYMAN WEINBERG AND CHARLES WEINBERG, OF BROOKLYN, NEW YORK; SAID CHARLES WEINBERG ASSIGNOR TO SAID HYMAN WEINBERG.

SAFETY DEVICE FOR AUTOMOBILES.

14,831. Specification of Reissued Letters Patent. Reissued Mar. 30, 1920.

Original No. 1,222,828, dated April 17, 1917, Serial No. 100,801, filed May 31, 1916. Application for reissue filed January 18, 1918. Serial No. 212,426.

*To all whom it may concern:*

Be it known that we, HYMAN WEINBERG, a citizen of the United States, and CHARLES WEINBERG, a subject of the Czar of Russia, both residents of the city of New York, borough of Brooklyn, in the county of Kings and State of New York, have invented a new and Improved Safety Device for Automobiles, of which the following is a full, clear, and exact description.

This invention relates to safety appliances for automobiles and has for an object the provision of an improved arrangement which will prevent the automobile from running over a person or any other large object.

Another object in view is to provide an improved guard which will prevent a person struck by an automobile from falling beneath the wheels.

A still further object in view is to provide a guard for automobiles which will cushion the blow when the automobile runs against an object and will also, at the same time, apply a special set of brakes to the wheels of the automobile.

A further object of the invention is to provide not only a guard for preventing objects from falling beneath the wheels of the automobile, but to present means which will act as emergency wheels in case the tire of the automobile gets out of order and is unusable, and to provide means for raising and lowering said wheels, and for holding them in adjusted positions.

A further object of the invention is to provide a bumper-bar supported from the knuckle-joint members of the vehicle that will be carried in front of, and be dirigible with the front wheels; also to pivotally connect said bumper-bar to the braking mechanism of the two front wheels, in such manner that the brakes will be applied to both of said wheels whenever the bumper-bar strikes a foreign body with sufficient force.

In the accompanying drawing:—

Figure 1 is a side view of an automobile with an embodiment of the invention applied thereto.

Fig. 2 is a top plan view of the front part of the automobile and associated parts shown in Fig. 1.

Fig. 3 is a side view of a wrench embodying certain features of the invention.

Fig. 4 is a section through Fig. 5 on line 4—4.

Figure 5:
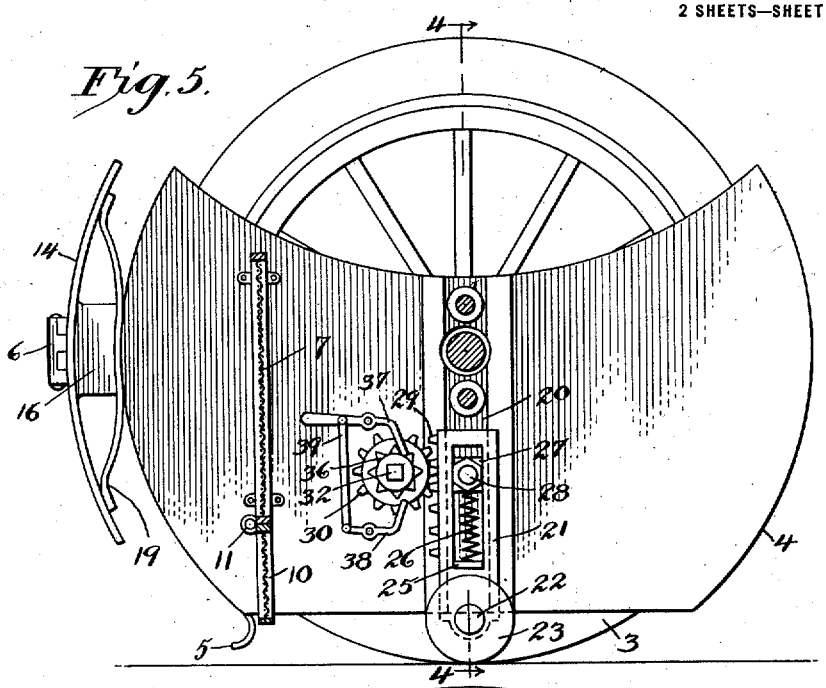
Fig. 5 is a side view of a wheel and one of the guards embodying the invention, the same being a section through Fig. 4 approximately on line 5—5.

Referring to the accompanying drawings by numerals, 1 indicates an automobile of any desired kind which is provided with wheels 2 of any suitable kind having pneumatic tires 3. It is evident that any kind of vehicle could be substituted for the automobile 1 without departing from the spirit of the invention and also any kind of wheel and tire, as these members do not form any part of the invention. Connected to or partially surrounding each wheel is a guard 4, the front guards being provided with curved extensions 5 for preventing the wheel from running over any person or anything of any appreciable size. The front guards 4 are connected by a bumper-bar 6 and also, if desired, by a wire mesh or chain mesh shield 7, as shown in Fig. 5. When the shield 7 is used the same is connected to the two front guards 4 in any suitable manner and extended from one guard to the other, the connection being preferably by hinges 8 and 9, as shown in Fig. 2, so as not to interfere with the steering of the automobile. The shield 7 is preferably divided near the bottom so that there will be a lower section 10 hinged at 11 to the upper section. This is desirable when the device is used in winter and there is snow on the ground as otherwise the guard will gather up the snow. When the device is used and there is an appreciable layer of snow on the ground the section 10 is hinged upwardly and secured in any suitable way in a raised position. The bar 6 is intended to act as a bumper-bar, or buffing member, in case the automobile should strike against a person or any other vehicle or article. The bar 6 is hinged at 12 and 13 to the arc-shaped shields 14 and 15, respectively. These shields are of identical structure so that a description of one will apply to both.

Figure 6:
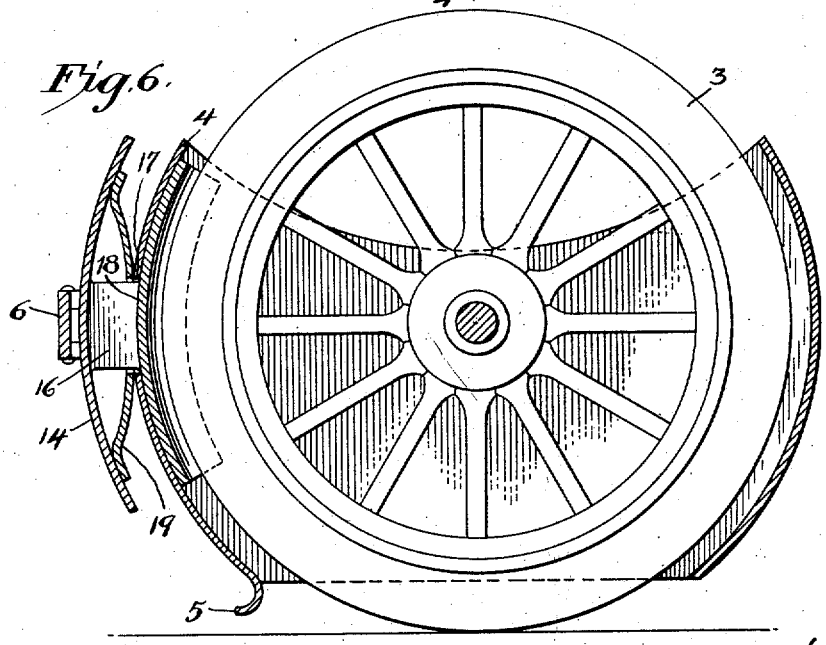
Fig. 6 is a sectional view through Fig. 4 on line 6—6.

As shown in Figs. 5 and 6 our braking mechanism comprises the shield 14 which has a bar or inwardly extending member 16 which projects through a suitable opening or slot 17 in the guard 4 and has secured to the end thereof a brake shoe 18, which brake shoe will press against the tire 3 in case the pressure on bar 6 is considerable. This will prevent further rotation of the front wheels and thus produce a stopping action in addition to the fact that the automobile is being resisted by the article struck. In this way the automobile will be brought to a stop quickly, especially when assisted by the driver, and without injuring to any considerable extent either the automobile or the person struck. In case a person is struck and is knocked down he cannot be run over, as the members 5 on the guards 4 will push him along in front of the automobile, but if he misses the members 5 he will be caught by the shield 7 and thus held from beneath the wheels. It is recognized that the person thus struck will be injured somewhat but not as much as if run over by the wheels. A spring 19 is provided which acts against the guard 4 and shield 14 so as to normally hold the shield at the outer position and resiliently resist an inward movement, such resistance being overcome when a considerable blow is struck. It will thus be seen that the resistance of the object struck will help stop the automobile and in addition will cause the brake shoe 18 to be applied to the front wheels, thus further assisting in the quick stopping of the automobile.

The guard 4 may be variously constructed but is preferably arranged with a front and back member and two side members so as to almost encircle the wheel, the lower edge extending near to the ground while the upper edge is preferably above the hub so as to insure against any person coming in contact with the wheel.

As shown in Fig. 4, the outer side member of the guard is supported upon the wheel-hub, while the inner side member thereof is attached to the knuckle-joints by ring members 40, with threaded portions extending into part of the guard. The guards, therefore, with the elements supported thereby, including the braking mechanism, the emergency wheels and the bumper-bar, are dirigible with the front wheels of the vehicle.

The entire construction of the guard 4 is preferably comparatively strong so as to act properly as a guard and in addition to act as emergency or temporary supporting means in case the tire 3 should become unusable, as for instance, by a puncture or blowout. When acting in this capacity the arrangement shown more particularly in Figs. 4 and 5 is used on each of the guards. This arrangement comprises a runway 20 in which a sliding member 21 is fitted, the arrangement being preferably somewhat on the order of a dovetail so that member 21 cannot accidentally become disengaged. A stub shaft 22 is mounted on the lower end of the slide 21, said stub shaft carrying a wheel 23 preferably formed with one or more ridges 24 whereby the wheel will prevent skidding when the wheel is in normal position as well as when the wheel is being used in an emergency case. The slide 21 is provided with an extension or shoulder 25 against which spring 26 presses, said spring also pressing against the block 27 which is rigidly secured to the guard 4 by a bolt 28. The sliding member 21 slides up and down past the block under some circumstances. On one edge of the sliding member 21 are arranged teeth 29, which teeth are positioned an appreciable distance apart so there will be a considerable loose motion between the same and the gear wheel 30 whereby when the parts are in the position shown in Fig. 5 the wheel 23 may move upwardly an appreciable distance without operating wheel 30. This is to allow the wheel 23 to act as an anti-skidding device without interfering with the resiliency of the tire 3. When the tire 3 has become unusable and is deflated the weight of the automobile will force the guard 4 and the gear wheel 30 downwardly until the same rests on one of the teeth of the rack 21 and thereby become supported on wheel 23.

If the downward movement of the axle of the automobile is too great wheel 23 may be operated for causing the guard 4 and associated parts to be elevated, said operation being by a wrench 31 fitting the squared shaft 32. The wrench 31 is provided with a rotating ratchet wheel 33 held against reverse movement by a pawl 34, the hole 35 in the wheel extending entirely therethrough so that when it is desired to rotate the shaft 32 in one direction the wrench is placed in position with one face toward the wheel 30, and when it is desired to rotate the wheel in the opposite direction the opposite face of the wrench is placed next to the wheel 30. A double acting ratchet wheel 36 is rigidly secured to the gear wheel 30 and coacts with the pawls 37 and 38, which pawls are pivotally mounted on the guard 4 and are connected by a link 39. When the pawls are in the position shown in Fig. 5 the same will limit the upward movement of the slide 31 but will not limit the downward movement thereof, thus allowing the wheel 23 to always remain in contact with the ground. Also, when the pawls are in this position, the sliding member 21 may be moved downwardly by turning the wheel 36 by means of the wrench 31, so that these parts, together with the emergency wheel, may be used to jack up the driving wheel in order to replace a tire, or for other purposes. In case it should be desired to elevate the wheel 23 the position of the pawls will be reversed and then the shaft 32 rotated for rotating gear wheel 30 to any desired extent.

What we claim is:

1. In a safety device for vehicles, a guard for each wheel, each of said guards being provided with a surrounding member for substantially covering the wheel while allowing the wheel to act in its usual capacity, a sliding member arranged on each of said guards, a wheel connected with the lower part of said sliding member and adapted to engage the ground and act as an anti-skidding device and an emergency wheel, a spring for resiliently holding the wheel against the ground when acting as an anti-skidding device, and means for raising and lowering the wheel and holding the same in place when acting as an emergency wheel.

2. In a safety device of the character described, a guard adapted to surround each wheel, each of said guards being provided with a slideway, a sliding bar arranged in said slideway, a wheel pivotally mounted at the lower end of said bar, a spring for resiliently holding said bar and wheel in a lowered position so as to cause the wheel to act as an anti-skidding device, a rack arranged on one side of said sliding bar, and means acting on said rack for raising and lowering the same and for holding the same together with said bar and wheel in any adjusted position.

3. In a safety device for vehicles, a guard substantially surrounding each of the front wheels, a brake shoe arranged interiorly of the front part of each of said guards, a sliding bar extending through the front of each of said guards for supporting said brake shoe, a buffer member connected with each of said sliding bars, a spring for resiliently holding said buffer member in a predetermined position and said brake shoes away from the wheels surrounded by said guards, and a transverse bar for connecting said buffer members, whereby when said buffer members or said transverse bars are pressed the same will cause said brake shoes to engage the front wheels and act as a brake therefor.

4. In a safety device for vehicles, a guard substantially surrounding each wheel individually, a plurality of emergency wheels, means for slidingly connecting one of said emergency wheels with each of said guards, a rack connected with each of said means, a gear wheel meshing with each of said racks, a ratchet wheel connected with each of said gear wheels, and a pair of oppositely acting pawls for controlling the rotation of said ratchet wheels, said ratchet wheels having squared tool receiving extensions.

5. In a safety device for vehicles, a guard substantially surrounding each of the front wheels of said vehicle, a brake shoe arranged interiorly of the front part of each of said guards, a sliding bar extending through the front of each of said guards for supporting said brake shoes, a buffer member connected with each of said sliding bars, and a spring for resiliently holding said buffer members in a predetermined position and said brake shoes away from the wheels surrounded by said guards, whereby when said buffer members are pressed the same will cause said brake shoes to engage said front wheels and act as a brake therefor.

6. In safety devices for vehicles, guards substantially surrounding the steering wheels, brakes operably mounted upon said guards in front of said wheels to directly engage the same and normally held apart therefrom, and means for imparting a braking impulse upon said wheels upon striking a foreign body.

7. In safety devices for vehicles, guards substantially surrounding the steering wheels, brakes adapted to directly engage each of said wheels operably mounted upon said guards in front of said wheels and normally held apart therefrom, and means connecting the braking mechanisms of the opposite wheels to operate the same simultaneously upon striking a foreign body.

8. In safety devices for vehicles, guards substantially surrounding the steering wheels, shields arranged in front of said guards, bars secured to said shields and slidably extended through said guards, and braking mechanism for said wheels attached to said bars and adapted to be operated thereby.

9. In safety devices for vehicles, guards substantially surrounding the steering wheels, shields arranged in front of said guards, independent bars secured to each of said shields and slidably extended through said guards respectively, and independent braking mechanism for each of said wheels attached to said bars and adapted to be operated thereby, and means connecting the braking mechanisms of opposite wheels adapted to apply a braking impulse simultaneously thereto upon striking a foreign body.

10. In safety devices for vehicles, guards substantially surrounding the steering wheels, shields arranged in front of said guards, bars secured to said shields and slidably extended through said guards, braking mechanism for said wheels attached to said bars, and resilient means adapted to normally hold said braking mechanism away from said wheels.

11. In safety devices for vehicles, guards substantially surrounding the steering wheels, shields arranged in front of said guards, bars secured to said shields and slidably extended through said guards, braking mechanism attached to said bars, resilient means adapted to normally hold said braking mechanism away from said wheels, and pivoted means connecting the braking mechanisms of opposite wheels to operate the same simultaneously.

12. In safety devices for vehicles, vertically movable emergency wheels arranged beside the steering wheels, supports therefor carried by the vehicle and dirigible with said steering wheels, and means for holding said emergency wheels in adjusted positions.

13. In safety devices for vehicles, an emergency wheel arranged beside each of the front wheels of the vehicle and adapted to act to support the vehicle upon the disablement of the vehicle wheel contiguous thereto, and supporting means therefor connected with the knuckle-joint of the vehicle.

14. In safety devices for vehicles, emergency wheels of the type described arranged beside each of the vehicle wheels, each of which is adapted to act to support the vehicle upon the disablement of a vehicle wheel contiguous thereto, and means for raising and lowering said emergency wheels.

15. In safety devices for vehicles, emergency wheels arranged beside each of the wheels of the vehicle and adapted to act to support the vehicle upon the disablement of a vehicle wheel, means for supporting said emergency wheels upon the vehicle, and means for regulating the vertical positions thereof and for holding the same in adjusted positions.

16. In safety devices for vehicles, a wheel guard substantially surrounding a vehicle wheel, supporting means therefor, an emergency wheel adapted to act in place of the vehicle wheel upon the disablement of the latter, said emergency wheel being supported by said guard and movable thereon, and means for adjustably regulating the position of said emergency wheel with respect to said guard, and for holding the same in adjusted positions.

17. In safety devices for vehicles, a wheel guard adapted to substantially surround a vehicle wheel, a slide-bar arranged upon said guard, an emergency wheel supported by said slide-bar, and means for holding said slide-bar and emergency wheel in adjusted positions with respect to said guard.

18. In safety devices for vehicles, a wheel guard adapted to substantially surround a vehicle wheel, a slide-bar supported by and capable of vertical movement upon said guard, an emergency wheel pivotally attached to said slide-bar, and means for adjustably regulating the position of said slide-bar upon said guard.

19. In safety devices for vehicles, a wheel guard attached to the vehicle, an emergency wheel, supports for the latter arranged vertically upon said guard and movable thereon, and means for limiting the vertical movements of said supports.

20. In safety devices for vehicles, a wheel guard, an emergency wheel, supports for the latter arranged vertically upon said guard and movable thereon, a resilient bearing for said supports, and means for limiting the vertical movements of said supports.

21. In safety devices for vehicles, guards for the front wheels of the vehicle, and a vertical shield extended between and pivotally attached to the guards of the opposite wheels, said shield having a pivoted lower section arranged and adapted to be supported in lowered and elevated positions.

In witness whereof we have hereunto set our hands at New York, in the county of Kings, and State of New York, this 11 day of October, 1917.

HYMAN WEINBERG.
CHARLES WEINBERG.